INVENTOR
Friedrich Beerbom

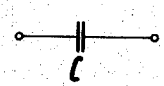
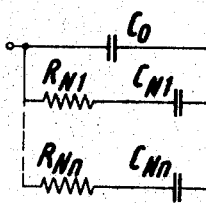
Fig. 1a
Fig. 1b
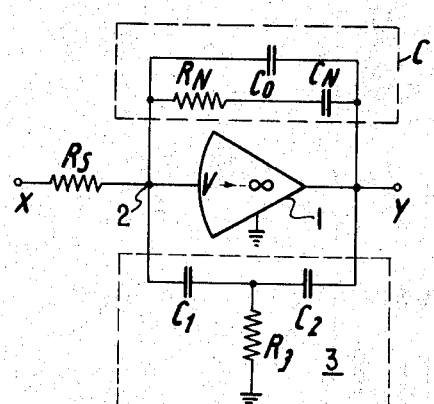
Fig. 2
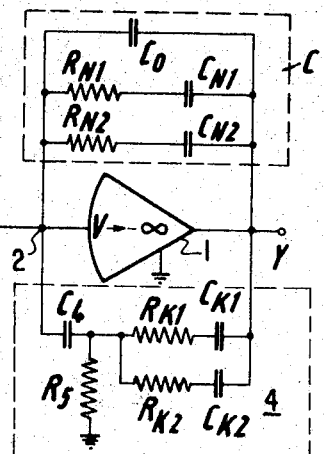
Fig. 3
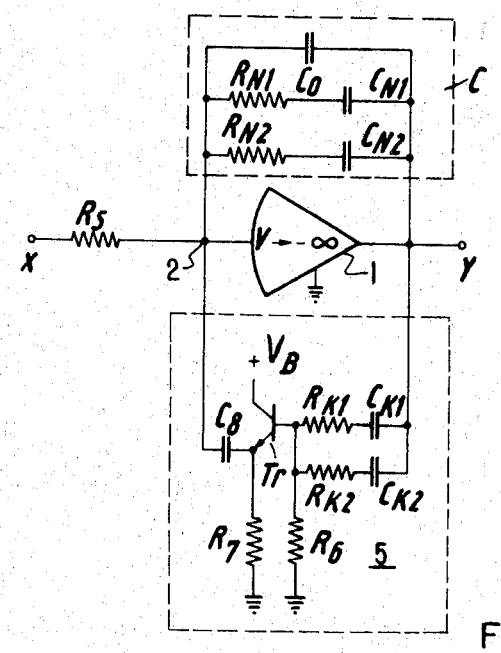
Fig. 4
Inventor:
Friedrich Beerbom
BY Spencer & Kaye
ATTORNEYS.

BY *Spencer & Kaye*

ATTORNEYS.

3,564,396
FOUR-POLE NETWORK EMPLOYED AS AN IMPROVED COMPENSATING CIRCUIT FOR A CAPACITOR'S DIELECTRIC ABSORPTION LOSSES
Friedrich Beerbom, Constance, Germany, assignor to Telefunken Patentverwertungsgesellschaft m.b.H., Ulm (Danube), Germany
Filed Sept. 30, 1969, Ser. No. 862,271
Claims priority, application Germany, Oct. 1, 1968, P 18 00 206.7
Int. Cl. G05f *1/10*
U.S. Cl. 323—66                                13 Claims

ABSTRACT OF THE DISCLOSURE

A four-pole network connected as an equalizing means in an integrator composed of an amplifier and a capacitor forming a feed-back loop for the amplifier, to compensate for the losses due to dielectric absorption in the integrating capacitor, the network being connected by two of its terminals across the capacitor to receive a signal from the capacitor and to supply the capacitor with a current whose amplitude characteristic is chosen so as to compensate for the voltage changes produced by such dielectric absorption.

BACKGROUND OF THE INVENTION

The present invention relates to an arrangement for compensating for the changes in voltage produced by dielectric absorption in an integrating capacitor.

The effect of dielectric absorption upon capacitors is described in the article "An Analysis of Certain Errors in Electronic Differential Analyzers," IRE Transactions on Electronic Computers, (1958), pages 17 to 22. FIG. 1*a* of the present drawings shows the symbol for a real capacitor, and FIG. 1*b* shows the equivalent circuit for such capacitor with an ideal capacitor $C_0$ to which a plurality of RC branches $R_{N1}$ $C_{N1}$ up to $R_{Nn}$, $C_{Nn}$ are connected in parallel. These RC branches represent the losses occurring in the real capacitor C of FIG. 1*a* due to dielectric absorption. Leakage losses have not been considered in this equivalent diagram.

The dielectric absorption represented in the equivalent circuit of FIG. 1*b* by the parallel RC branches affects the response of the real capacitor C in the following manner. If a pulse having a definite voltage value and a width which is less than the greatest of the time constants of each of the RC branches is applied to the real capacitor C, the voltage across the capacitor will decrease slightly after the pulse is ended. This decrease is due to at least one RC branch being only partially charged by the pulse, and discharging capacitor $C_0$. In an analogous manner, an increase in voltage will subsequently follow the voltage decrease. This change in voltage may amount to 0.1% of the charge voltage in real capacitors.

If these types of capacitors (those having large dielectric absorption) are used in precision analogue computers, as storage elements for example, this voltage error produced by the dielectric absorption (variations in the capacitor dielectric constants) is not acceptable.

There are, in fact, capacitors for which the dielectric absorption losses are so small that they could be disregarded even when the capacitors were used in analogue computers. However, these capacitors exhibit such relatively high temperature coefficients that they also can not be used, in practice, as precision analogue storage elements. Due to the effects of dielectric absorption, all the capacitors currently available which have low temperature coefficients are characterized by errors of the order of magnitude noted above.

A solution to the problem set out above is disclosed in U.S. patent application Ser. No. 718,861, Haussmann et al., filed Apr. 4, 1968, and which is assigned to the assignee of this application. In application Ser. No. 718,861 there is described a two-pole equalizing means which detects the capacitor voltage and feeds a current into the capacitor with such an amplitude-time characteristic that the changes in voltage in the real capacitor are equalized.

SUMMARY OF THE INVENTION

It is an object of the present invention to provide an improved solution to the problem set out above.

It is also an object of the present invention to permit capacitors which have losses due to dielectric absorption to be used as analogue stores and particularly as integrating capacitors in integrating circuits.

The above objects are carried out according to the present invention by connecting a four-pole network across the operational amplifier. This arrangement also puts the four-pole network across the integrating capacitor. This four-pole network is so designed that the current fed to the integrating capacitor by the operational amplifier in interaction with the four-pole network has such an amplitude-time characteristic that the integrating capacitor continuously exhibits that capacitor voltage which ordinarily would be present only after a long period of time had elapsed. In the preferred embodiments the four-pole network according to the invention is so designed that its output current at the terminal connected with the input of the operational amplifier is substantially proportional to the differential of the input current of the RC branches representing the dielectric absorption at that side which is connected with the output of the operational amplifier.

BRIEF DESCRIPTION OF THE DRAWINGS

FIG. 1*a* is a schematic diagram of a real capacitor.

FIG. 1*b* is a schematic diagram of the equivalent circuit of the capacitor of FIG. 1*a*.

FIG. 2 is a schematic diagram of a first embodiment for equalizing the losses produced by dielectric absorption, according to the present invention.

FIG. 3 is a schematic diagram of a second embodiment for equalizing the losses produced by dielectric absorption, according to the present invention.

FIG. 4 is a schematic diagram of a third embodiment for equalizing the losses produced by dielectric absorption, according to the present invention.

DESCRIPTION OF THE PREFERRED EMBODIMENTS

Figure 5:
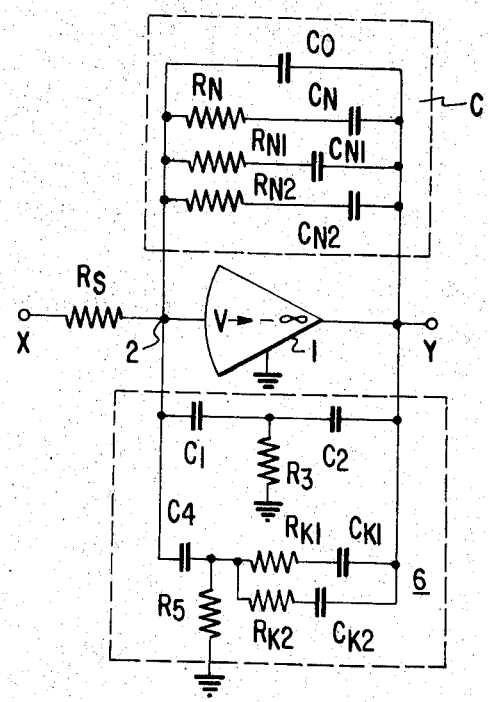
FIG. 5 shows a fourth embodiment of the present invention.

FIG. 2 of the drawing shows an analogue D.C. or operational amplifier 1, which has a very high negative gain. In combination with the amplifier 1 is connected an integrating capacitor C and a resistor $R_s$ to form an integrator circuit. The input voltage of the integrator circuit is indicated by $x$, and the output voltage is indicated by $y$. The integrating capacitor C is illustrated by its equivalent diagram, which shows an ideal capacitor $C_0$ in parallel with a RC branch. The RC branch consists, as in FIG. 1*b*, of a capacitor $C_N$ and a resistor $R_N$, which represents the dielectric absorption. Between the input and the output of the operational amplifier and ground, a passive T network 3 is inserted. The longitudinal branches of this T network are capacitances $C_1$ and $C_2$, and the transverse branch is a resistor $R_3$. Since the voltage at input 2 of the direct voltage amplifier is always approximately equal to zero, it is described by the following current balance:

$$0 = \frac{x}{R_s} + ypC_0 + y\frac{pC_N}{1+pC_N R_N} + y\frac{pR_3 C_1 \cdot pC_2}{1+pR_3(C_1+C_2)};$$
$$(p=j\omega)(j=\sqrt{-1}) \quad (1)$$

If $R_3(C_1+C_2)$ is made equal to the time constant $C_N R_N$, the following equation results:

$$0 = \frac{x}{R_s} + ypC_0 + ypC_N \frac{1+p\frac{C_1 C_2}{C_N}R_3}{1+pC_N R_N} \quad (2)$$

If now $$\frac{C_1 C_2 R_3}{C_N}$$

is made equal to the time constant $C_N R_N$, the following equation results:

$$0 = \frac{x}{R_s} + yp(C_0 + C_N) \quad (3)$$

i.e., the capacitor containing the dielectric absorption acts in this circuit in the same manner as an ideal capacitor with the capacitance $C_0+C_N$, if the following requirements are met:

$$R_3(C_1+C_2) = C_N R_N \quad (4)$$

$$C_1 C_2 R_3 = C_N^2 R_N \quad (5)$$

If it is impossible to avoid overload of the integrator, it will be advisable to select the elements of the T network 3 so that the time constant $C_1 R_3$ is much less than the time constant $C_2 R_3$. Since the capacitor $C_1$ is connected to point 2, the overload recovery time for the integrator is not substantially increased by the arrangement according to the embodiment of FIG. 2.

The T network 3 shown in FIG. 2 has been found to be well suited for use where the time constants of the dielectric adsorption are smaller than 0.5 second. If a plurality of RC branches are to be considered in the equivalent circuit diagram of the integrating capacitor, the time constant corresponding to each RC branch can have a T network dimensioned according to FIG. 2; these T networks are then connected in parallel.

FIG. 3 shows a second embodiment of the present invention. Two RC branches are provided in the equivalent circuit diagram of the integrating capacitor C; i.e. $R_{N1}C_{N1}$ and $R_{N2}C_{N2}$. Between the input and the output of the operational amplifier 1 there is inserted a T network 4 whose one longitudinal branch is a capacitance $C_4$, whose transverse branch is a resistor $R_5$ and whose other longitudinal branch consists of two parallel-connected RC branches, i.e. $R_{K1}C_{K1}$ and $R_{K2}C_{K2}$. Again the voltage at the input 2 of the amplifier will always be approximately equal to zero. Taking in addition to this, the following further prerequisites:

$$R_5 \ll R_{K1}, \; R_5 \ll R_{K2}, \; R_5 \ll \frac{1}{pC_4} \quad (6)$$

(where $P=j\omega$. The angular frequency $\omega$ should have the highest of all values for $$\frac{1}{R_{K\nu}C_{K\nu}} \; (\nu = 1 \ldots n)$$

When these prerequisites are satisfied, the voltage at $R_5$ is approximately proportional to the sum of the currents through the RC branches $R_{K1}C_{K1}$, $R_{K2}C_{K2}$, an approximate differentiation is accomplished through $C_4$). The following approximate current balance equation results for point 2 (for the reasons of clarity only RC branches $R_{N1}C_{N1}$ and $R_{K1}C_{K1}$ are considered in the equations):

$$0 \approx \frac{x}{R_s} + ypC_0 + yp\frac{C_{N1}}{1+pC_{N1}R_{N1}} + y\frac{pC_{K1}R_5 pC_4}{1+pC_{K1}R_{K1}} \quad (7)$$

If now the time constant $R_{K1}C_{K1}$ is made equal to the time constant $R_{N1}C_{N1}$, the following equation results:

$$0 \approx \frac{x}{R_s} + ypC_0 + ypC_{N1}\frac{1+p\frac{C_4 C_{K1} R_5}{C_{N1}}}{1+pC_{N1}R_{N1}} \quad (8)$$

If now $C_4 C_{K1} R_5 = C_{N1}^2 R_{N1}$, the following equation results:

$$0 \approx \frac{x}{R_s} + yp(C_0 + C_{N1}) \quad (9)$$

An expansion of the current balance equation while considering the second time constant in the equivalent circuit diagram of the capacitors and the second time constant in the T network offers no difficulties. The real capacitor C acts as an ideal capacitor with the capacitance $C_0+C_{N1}+C_{N2}$, when the following dimensioning rules are kept:

$$C_{K1}R_{K1} = C_{N1}R_{N1}$$

$$C_{K2}R_{K2} = C_{N2}R_{N2}$$

$$C_4 C_{K1} R_5 = C_{N1}^2 R_{N1}$$

$$C_4 C_{K2} R_5 = C_{N2}^2 R_{N2}$$

$$R_5 \ll R_{K1}$$

$$R_5 \ll R_{K2}$$

$$R_5 \ll \left|\frac{1}{pC_4}\right| \quad (10)$$

A change in voltage of the integrating capacitor of the embodiment of FIG. 3 is also avoided when the terminals of the T network 4 are reversed with respect to the amplifier 1, from the connections shown in FIG. 3. If however, overloading of the integrator can not be avoided, it will be advisable to use the arrangement indicated in FIG. 3. In this case, the values of the individual structural components of the four-pole network 4 should be selected so that the time constant $C_4 R_5$ is very small; then the recovery time of the integrator will not be substantially lengthened after overloading.

The arrangement shown in FIG. 3 has been found to be well suited for use where the time constants of the dielectric absorption are higher than about 0.5 second. If the consideration of different time constants in the dielectric absorption should make it necessary, one, or a plurality, of four-pole networks according to FIG. 2 can be connected in parallel with a four-pole network according to FIG. 3.

FIG. 5 shows an embodiment of the present invention, in which the T network of FIG. 2 and the T network of FIG. 3 are combined to a network 6, which serves for compensation of the influence of the RC branches $R_N C_N$, $R_{N1}C_{N1}$, $R_{N2}C_{N2}$.

If it should not be possible, for some reason, to make the resistor $R_5$ in the arrangement of FIG. 3 so small that the time constant $R_5 C_4$ is sufficiently small to minimize the effect of overload, then it is possible, as shown in FIG. 4, to provide a transistor amplifier which effects a resistance transformation. In FIG. 4, a transistor TR is connected as an emitter follower in the T network 5. The collector of transistor TR is connected to the positive pole of a voltage supply source. The emitter of transistor TR is connected to ground via a resistor $R_7$; and also is connected to the input of the operational amplifier 1 via a capacitor $C_8$, which corresponds functionally to capacitor $C_4$ of FIG. 3. The base of transistor TR is connected to ground via a resistor $R_6$, and also is connected to the output of the operational amplifier 1 via RC branches $R_{K1}C_{K1}$ and $R_{K2}C_{K2}$. Since the output resistance of the emitter follower is very low, it is possible to realize a very low time constant for the capacitor $C_8$ and the output resistance of the emitter follower.

Figure 6:
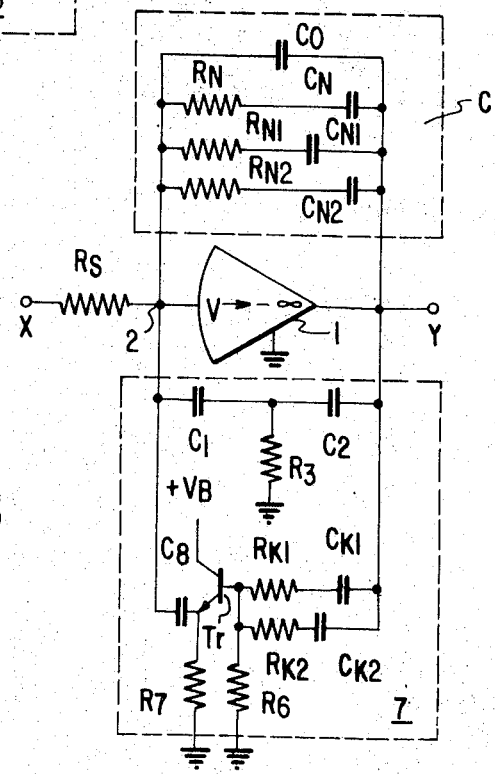
FIG. 6 shows a fifth embodiment of the present invention.

Of course, the four-pole networks shown in FIGS. 2, 3 and 4 can also be employed together, and be connected in parallel when it is desired to consider a plurality of time constants in the dielectric absorption. FIG. 6 shows such a circuit, in which the network 3 of FIG. 2 and the network 5 of FIG. 4 are combined to a network 7, which serves for compensation of the influence of the RC branches $R_N C_N$, $R_{N1} C_{N1}$, $R_{N2} C_{N2}$.

The present invention makes it possible to reduce the errors due to dielectric absorption down to approximately 10% of the original errors. In many cases this can be achieved with little effort. This is possible in numerous cases without the additional use of active elements. Moreover, when the dimensioning rules set out above are observed, the recovery time of the integrator is not substantially extended by the addition of the equalizing means according to the present invention. In an advantageous manner the equalizing means can be housed in a common housing with the integrating capacitor, which simplifies the construction of the integrator. Such a housing is suggested by the dashed lines of FIGS. 2–6.

It will be understood that the above description of the present invention is susceptible to various modifications, changes and adaptations.

I claim:

1. In a circuit which includes an operational amplifier and an integrating capacitor connecting the output of said amplifier with its input, the improvement comprising equalizing means including a four-pole network connected across said amplifier for receiving a signal from said capacitor and supplying said capacitor with a current which is derived from such signal and which compensates for the losses in said capacitor due to dielectric absorption.

2. The circuit defined in claim 1 wherein said capacitor exhibits an electrical behavior equivalent to that of an ideal capacitor connected in parallel with at least one series RC branch and the output current of said four-pole network at the terminal connected with the input of said operational amplifier is substantially proportional to the differential of the input current of said at least one series RC branch at that side which is connected with the output of said operational amplifier.

3. The circuit defined in claim 2 wherein said four-pole network substantially consists of a T network, the transverse branch of said T network including ohmic resistance means connected to ground, and the two longitudinal branches of said T network including capacitance means connected across said amplifier.

4. The circuit defined in claim 3 wherein each of said capacitance means of said T network is a capacitor and said transverse branch is a resistor.

5. The circuit defined in claim 4 wherein the values of said resistor and said two capacitors are limited by the following equations:

$$R_3(C_1+C_2) = C_{N\nu} R_{N\nu}$$

$$(\nu = 1 \ldots n)$$

$$C_1 C_2 R_3 = C_{N\nu}^2 R_{N\nu}$$

where $C_{N\nu}$ and $R_{N\nu}$ represent the value of that of said at least one RC series branch, the influence of which has to be eliminated.

6. The circuit defined in claim 3 wherein the said transverse branch of said four-pole network is a resistor, one of said two longitudinal branches is a capacitor and the other of said two longitudinal branches is at least one series connection of a resistor and a capacitor.

7. The circuit defined in claim 6 wherein said other of said two longitudinal branches is a plurality of said series connections of a resistor and a capacitor connected together in parallel.

8. The circuit as defined in claim 7 wherein the values of said resistors and said capacitors are limited by the following equations:

$$C_{K\nu} R_{K\nu} = C_{N\nu} R_{N\nu}$$

$$C_4 C_{K\nu} R_5 = C_{N\nu}^2 R_{N\nu}$$

$$R_5 \ll R_{K\nu}; \ (\nu = 1 \ldots n)$$

$$R_5 \ll \left| \frac{1}{pC_4} \right|$$

$(p=j, \omega, \omega=$ maximum of all values $$\frac{1}{R_{K\nu} C_{K\nu}})$$

where $C_{N\nu}$ and $R_{N\nu}$ represent the values of the resistor-capacitor series connections which, in the equivalent circuit of said integrating capacitor, are disposed in parallel with said ideal capacitor so as to describe the dielectric absorption.

9. The circuit as defined in claim 3 wherein the longitudinal branch which is connected to the input of said amplifier has a much smaller time constant than the longitudinal branch which is connected to the output of said amplifier.

10. The circuit defined by claim 3 wherein said T network includes an amplifier means.

11. The circuit as defined in claim 10 wherein said amplifier means is a transistor amplifier connected in said transverse branch of said T network as an emitter follower, the emitter of said transistor amplifier being connected to one pole of the voltage supply by means of an emitter resistor and to that longitudinal branch of said T network which is connected to the input of said amplifier, the base of said transistor amplifier being connected to said one pole of said voltage supply source by means of a resistor and to that longitudinal branch of said T network which is connected to the output of said amplifier, the collector of said transistor amplifier being connected to the other pole of said voltage supply source.

12. The circuit defined in claim 2 wherein a plurality of four-pole networks are connected in parallel in order to consider a plurality of time constants of the dielectric absorption.

13. The circuit as defined in claim 1 wherein said four-pole network and said integrating capacitor are housed in a common housing.

References Cited

UNITED STATES PATENTS

| | | | |
|---|---|---|---|
| 3,387,208 | 6/1968 | Foley | 324—60 |
| 3,421,077 | 1/1969 | Liu et al. | 324—61 |

JAMES D. TRAMMELL, Primary Examiner

G. GOLDBERG, Assistant Examiner

U.S. Cl. X.R.

323—93; 324—60